United States Patent [19]

Abrams

[11] 4,197,093
[45] Apr. 8, 1980

[54] METHOD AND APPARATUS FOR SEPARATING ISOTOPES USING STATE SELECTION

[75] Inventor: Richard L. Abrams, Pacific Palisades, Calif.

[73] Assignee: Hughes Aircraft Company, Culver City, Calif.

[21] Appl. No.: 733,675

[22] Filed: Oct. 18, 1976

[51] Int. Cl.² .............................................. B03C 1/00
[52] U.S. Cl. .......................................... 55/2; 55/101; 250/423 P; 250/251
[58] Field of Search .................. 55/2, 101; 250/423 P, 250/251

[56] References Cited

U.S. PATENT DOCUMENTS

| | | | |
|---|---|---|---|
| 2,879,439 | 3/1959 | Townes | 315/5.34 |
| 3,443,087 | 5/1969 | Robieux et al. | 55/2 |
| 3,558,877 | 1/1971 | Pressman | 250/251 |

OTHER PUBLICATIONS

Gorden et al., The Maser-New Type of Microwave Amplifier, Frequency Standard & Spectrometer, Physical Review, vol. 99, No. 4, 8/15/55, pp. 1264-1274.

Concepts of Modern Physics-Beiser, McGraw Hill, New York (1967), pp. 297, 387.

Primary Examiner—Bernard Nozick
Attorney, Agent, or Firm—Paul M. Coble; W. H. MacAllister

[57] ABSTRACT

A beam of ammonia molecules including the isotopes $N^{15}H_3$ and $N^{14}H_3$ is generated wherein some of the molecules of each isotope reside in an asymmetric energy state and other of the molecules of each isotope reside in a symmetric energy state. The symmetric state molecules are removed from the beam in a first state selector to provide a beam containing substantially only asymmetric state molecules of each isotope. The latter beam is fed to a resonant microwave cavity where it interacts with microwaves of a frequency inducing asymmetric state to symmetric state transitions for molecules of one of the isotopes but not for molecules of the other isotope. Either the asymmetric state molecules or the symmetric state molecules are removed from the resultant beam in a second state selector to provide a beam containing substantially only molecules of the other energy state enriched in the isotope $N^{15}H_3$.

9 Claims, 2 Drawing Figures

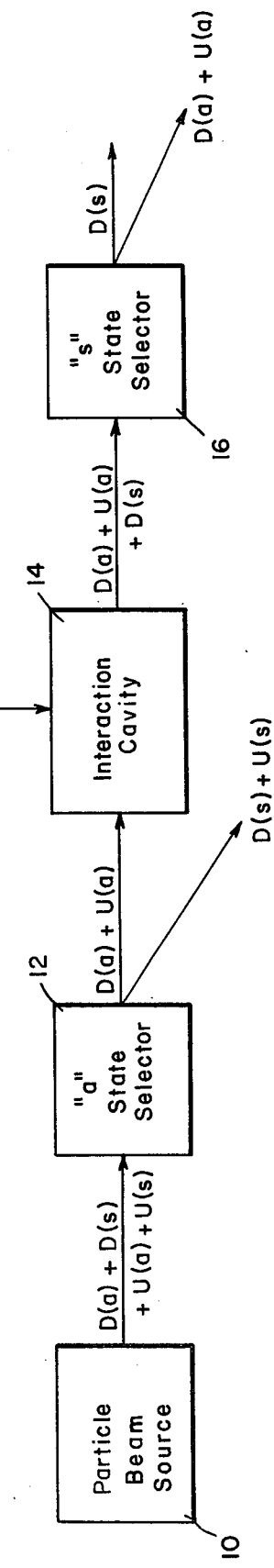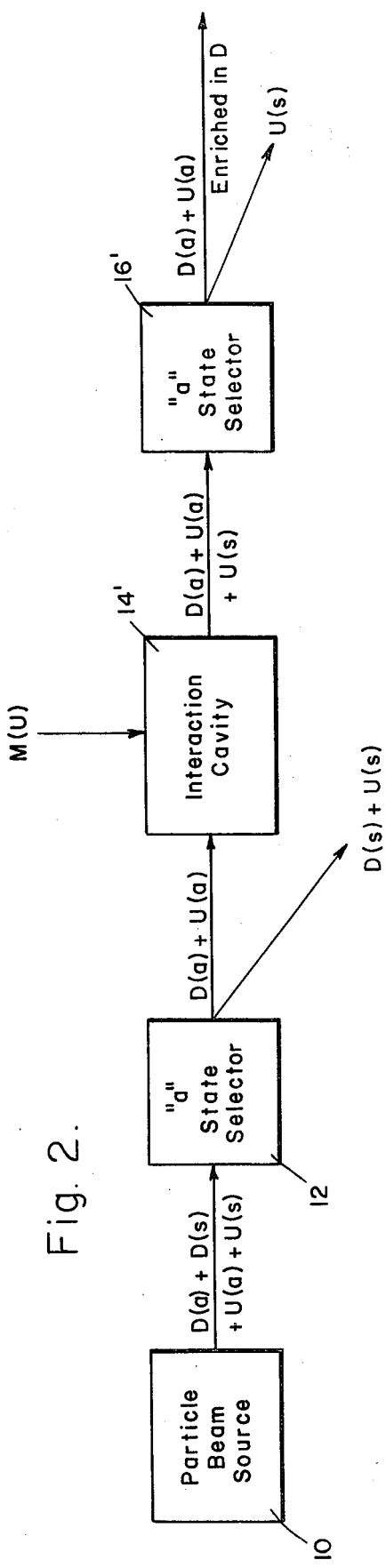

METHOD AND APPARATUS FOR SEPARATING ISOTOPES USING STATE SELECTION

BACKGROUND OF THE INVENTION

This invention relates to the separation of isotopes, and more particularly, it relates to isotope separation methods and apparatus utilizing energy state selectivity.

In the past many schemes for the separation, or at least the enrichment, of particular isotopic forms of certain chemical elements have been proposed and demonstrated including separation by gaseous diffusion through a porous barrier, electromagnetic separation using a mass spectrometer, centrifugal separation, separation by thermal diffusion, separation by fractional distillation, electrolytic separation, and chemical separation using isotopic exchange reactions with other elements.

Recently, several isotope separation schemes have been devised based on selective optical excitation of a desired isotope in a mixture of isotopes using a tunable laser. In these schemes the laser is tuned so that its output coincides in frequency with an allowed transition of the desired isotope but not with that of the undesired isotope. The selectively excited isotope is subsequently ionized by either absorption of light (supplied from a second laser or an incoherent source), by contact with a heated ionizing surface, or by generation of an electric discharge. Ions are thus produced from the excited isotope only, and these ions are then physically separated from the mixture.

A practical problem encountered with many of the aforementioned isotope separation techniques, e.g., the gaseous diffusion method, is that the enrichment ratio of the isotopes being processed (i.e., the ratio of the percentage of the desired isotope in the output mixture to the percentage of the desired isotope in the input mixture) is quite low. As a result, an extremely large number of stages are needed to obtain useful levels of enrichment of the desired isotope. Other of the aforementioned isotope separation techniques, e.g., electromagnetic separation, provide substantially higher enrichment ratios than the gaseous diffusion process. However, such high enrichment ratio processes are capable of handling only small amounts of isotopic material and, therefore, are impractical for high volume use. In addition, most of the aforementioned isotope separation techniques require a relatively large amount of energy per separated atom or molecule.

Another field of technology of relevance to the present invention but which heretofore was never associated with isotope separation is that of the molecular beam maser. In the original molecular beam maser a beam of ammonia molecules was formed by allowing ammonia molecules to diffuse out of a directional source consisting of many fine tubes. The beam then traversed a region in which a highly nonuniform electrostatic field formed a selective lens, focusing those molecules which were in upper inversion states while defocusing those in lower inversion states. The upper inversion state molecules emerging from the focusing field were directed into a resonant cavity in which downward transitions to the lower inversion states were induced. For further details concerning the molecular beam maser, reference may be made to the paper by J. P. Gordon, H. J. Zeiger and C. H. Townes, "The Maser—New Type of Microwave Amplifier, Frequency Standard, and Spectrometer", *Physical Review,* Vol. 99, No. 4 (Aug. 15, 1955), pages 1264–1274, and to U.S. Pat. No. 2,879,439, issued Mar. 24, 1959 to C. H. Townes and entitled "Production of Electromagnetic Energy."

However, prior to the present invention it was not seen how molecular beam maser technology could be modified and extended to advance the state of the isotope separation art.

SUMMARY OF THE INVENTION

It is an object of the present invention to provide a method for separating isotopes with much lower expanded energy per separated atom or molecule than has been achieved in the past.

It is a further object of the invention to provide a method for separating isotopes which achieves higher enrichment ratios than the prior art.

It is a still further object of the invention to provide an isotope separation technique capable of achieving substantially complete separation of the isotopes rather than mere enrichment.

It is still another object of the invention to provide simple and reliable isotope separation apparatus which is less costly than that presently in use.

In accordance with the invention a beam containing elementary particles (atoms or molecules) of first and second isotopes is generated wherein some of the particles of each of the isotopes reside in an asymmetric energy state and other of the particles of each of the isotopes reside in a symmetric energy state. The symmetric state particles are removed from the beam to provide a beam containing substantially only asymmetric state particles of the first and second isotopes. The latter beam is exposed to electromagnetic energy of a frequency inducing asymmetric state to symmetric state transitions for particles of one of the isotopes but not for particles of the other isotope. A selected one of the types of particles consisting of asymmetric state particles and symmetric state particles is removed from the resultant beam to provide a beam containing substantially only particles of the unselected type and enriched in the first isotope.

BRIEF DESCRIPTION OF THE DRAWING

In the accompanying drawing:

FIG. 1 is a block diagram illustrating isotope separation apparatus according to one embodiment of the invention; and FIG. 2 is a block diagram showing isotope separation apparatus according to another embodiment of the invention.

DESCRIPTION OF THE PREFERRED EMBODIMENTS

Referring to FIG. 1 with greater particularity, isotope separation apparatus according to the invention may be seen to include a source 10 of elementary particles (atoms or molecules) of first and second isotopes to be separated. It is pointed out that the principles of the invention are applicable to both atoms and molecules, and although the term "molecules" will be employed hereinafter for purposes of description, this term is intended to apply to atoms as well. In a preferred embodiment of the invention the source 10 produces a directed beam of molecules including both a desired isotope D and an undesired isotope U. As a specific example for illustrative purposes, the molecules may be of ammonia ($NH_3$), with $N^{15}H_3$ being the desired isotope and $N^{14}H_3$ being the undesired isotope. As a further example, the principles of the invention may be employed to separate or enrich desired molecules of deuterated ammonia ($N^{14}H_2D$) in a mixture of $N^{14}H_2D$ and $N^{14}H_3$. A specific exemplary source 10 for providing a beam of ammonia molecules is described in the aforementioned Gordon et al *Physical Review* paper.

The molecules emitted by the source 10 reside in a number of rotational energy levels of the ground vibrational manifold, each level having its own particular inversion splitting [the inversion splitting being the energy difference between asymmetric ("a") states and symmetric ("s") states]. Thus, the beam from the source 10 consists of molecules of the desired isotope D in both an "a" state and an "s" state, designated D(a) and D(s), as well as molecules of the undesired isotope U in both an "a" state and an "s" state, designated U(a) and U(s).

The molecular beam from the source 10 is fed to an "a" state selector 12 which separates the a-state molecules from the s-state molecules and retains the a-state molecules for further processing. An example of a specific "a" state selector 12 which may be employed is an electric field focuser as described in the aforementioned Gordon et al *Physical Review* paper. The "a" state selector 12 provides a molecular beam containing substantially only a-state molecules of both the desired and the undesired isotopes, i.e., D(a) and U(a), while discarding s-state molecules of both the desired and the undesired isotopes, i.e., D(s) and U(s), from the system.

The molecular beam from the "a" state selector 12 is fed to an interaction cavity 14 to which is also applied electromagnetic energy of a frequency inducing a-state to s-state transitions for molecules in a single rotational level (J,K) of the desired isotope but not for molecules of the undesired isotope. The interaction cavity 14 may be a resonant microwave cavity as described in the aforementioned Gordon et al *Physical Review* paper. As a specific illustrative example, when it is desired to excite $N^{15}H_3$ as the desired isotope, microwave interaction cavity 14 may be tuned to resonate with one of the (J,K) a-state to s-state transitions at a frequency of about 22.7 GHz, and a microwave input M(D) at this resonant frequency would be applied to the cavity 14. As a further example, when $N^{14}H_2D$ is to be excited, the frequency of the cavity resonance and the input microwaves may be about 5.1 GHz. Due to the slightly different a-state to s-state transition frequencies for the isotopes D and U, the incoming microwaves M(D) induce a-state to s-state transitions for isotope D molecules passing through the cavity 14 but not for the isotope U molecules. As a result of these a-state to s-state transitions, the molecular beam emerging from the interaction cavity 14 contains s-state molecules of the desired isotope D as well as a-state molecules of both the desired isotope D and the undesired isotope U.

The beam emerging from the interaction cavity 14 is applied to an "s" state selector 16 which separates the s-state molecules from the a-state molecules and provides substantially only s-state molecules as its output. As a specific illustrative example, the "s" state selector 16 may include an electric field focuser as described in the aforementioned Gordon et al *Physical Review* paper, except since such a focuser provides diverging s-state molecules, an annular collection arrangement would be required. Since the s-state molecules in the beam applied to the state selector 16 are only of the desired isotope D, and since the state selector 16 removes the a-state molecules from this beam, the output from state selector 16 contains substantially only molecules of the desired isotope D.

Isotope separation apparatus according to an alternate embodiment of the invention is illustrated in FIG. 2. Components in the embodiment of FIG. 2 which are the same as corresponding components in the embodiment of FIG. 1 are designated by the same reference numerals as their counterpart components in FIG. 1, while components in the embodiment of FIG. 2 which perform a similar function to but differ slightly from corresponding components in FIG. 1 are designated by the same basic reference numerals as their counterpart components in FIG. 1 but followed by a prime (') designation.

The embodiment of FIG. 2 differs from that of FIG. 1 in that interaction cavity 14' is tuned to the a-state to s-state transition frequency for the undesired isotope U, and an electromagnetic wave input M(U) at this transition frequency is applied to the cavity 14'. As a specific illustrative example, when it is desired to excite $N^{14}H_3$ in a mixture of the isotopes $N^{14}H_3$ and $N^{15}H_3$, interaction cavity 14' may be tuned to about 23.8 GHz, and a microwave input M(U) at about 23.8 GHz would be applied to the cavity 14'. Due to the slightly different a-state to s-state transition frequencies for the isotopes D and U, the microwaves M(U) induce a-state to s-state transitions for isotope U molecules passing through the cavity 14' but not for the isotope D molecules. Thus, the molecular beam emerging from the interaction cavity 14' contains s-state molecules of the undesired isotope U as well as a-state molecules of both the desired isotope D and the undesired isotope U.

The beam emerging from the interaction cavity 14' is fed to an "a" state selector 16' which may be the same as the "a" state selector 12. The state selector 16' separates the a-state molecules from the s-state molecules and provides substantially only a-state molecules as its output. Since the s-state molecules removed by the state selector 16' are all of the undesired isotope U, the output from the state selector 16' contains a higher percentage of desired isotope D molecules than the input, i.e., becomes enriched in the desired isotope D. Although the embodiment of FIG. 2 does not achieve complete separation of the isotopes D and U, a desired level of enrichment of the isotope D may be achieved simply by processing the output from the apparatus of FIG. 2 through a desired number of stages of such apparatus.

In a process according to the invention the electromagnetic waves applied to the interaction cavities 14 or 14' need only provide sufficient energy to induce the desired a-state to s-state transitions in the molecular beam traversing the interaction cavity, an energy far less than the ionization potential of the molecules. Thus, the present invention is able to separate the isotopes in the beam with much lower expanded energy per separated molecule than has been achieved in the past. In addition, when the embodiment of FIG. 1 is employed, substantially complete separation of the isotopes rather than mere enrichment may be obtained.

It should be apparent that a number of variations and modifications may be made to the isotope separation methods and apparatus disclosed hereinabove. For example, the electromagnetic radiation applied to the interaction cavities 14 or 14' to induce the desired a-state to s-state transitions may be a laser beam (generated by a $CO_2$ laser, for example) rather than microwave energy. Also, magnetic fields as well as electric fields may be employed to focus the beam molecules in either or both of state selectors. Moreover, as was mentioned above, atomic beams as well as molecular beams may be utilized.

Thus, although the present invention has been shown and described with reference to particular embodiments, nevertheless various changes and modifications which are obvious to a person skilled in the art to which the invention pertains are deemed to lie within the spirit, scope and contemplation of the invention.

What is claimed is:

1. A method for separating isotopes of a substance containing atoms or molecules of first and second isotopes comprising the steps of:
   providing a beam of said atoms or molecules wherein some of said atoms or molecules of each of said first and second isotopes reside in an asymmetric energy state and other or said atoms or molecules of each of said first and second isotopes reside in a symmetric energy state;
   removing the symmetric state atoms or molecules from said beam to provide a beam containing substantially only asymmetric state atoms or molecules of said first and second isotopes;
   exposing said beam containing substantially only asymmetric state atoms or molecules to electromagnetic energy of a frequency inducing asymmetric state to symmetric state transitions for atoms or molecules of one of said first and second isotopes but not for atoms or molecules of the other of said first and second isotopes; and
   removing a selected one of the types of atoms or molecules consisting of asymmetric state atoms or molecules and symmetric state atoms or molecules from the resultant beam to provide a beam containing substantially only atoms or molecules of the unselected type and enriched in said first isotope.

2. A method for separating isotopes of a substance containing atoms or molecules of first and second isotopes comprising the steps of:
   providing a beam of said atoms or molecules wherein some of said atoms or molecules of each of said first and second isotopes reside in an asymmetric energy state and other of said atoms or molecules of each of said first and second isotopes reside in a symmetric energy state;
   removing the symmetric state atoms or molecules from said beam to provide a beam containing substantially only asymmetric state atoms or molecules of said first and second isotopes;
   exposing said beam containing substantially only asymmetric state atoms or molecules to electromagnetic energy of a frequency inducing asymmetric state to symmetric state transitions for atoms or molecules of said first isotope but not for atoms or molecules of said second isotope; and
   removing the asymmetric state atoms or molecules from the resultant beam to provide a beam containing substantially only symmetric state atoms or molecules of said first isotope.

3. A method for separating isotopes for a substance containing atoms or molecules of first and second isotopes comprising the steps of:
   providing a beam of said atoms or molecules wherein some of said atoms or molecules of each of said first and second isotopes reside in an asymmetric energy state and other of said atoms or molecules of each of said first and second isotopes reside in a symmetric energy state;
   removing the symmetric state atoms or molecules from said beam to provide a beam containing substantially only asymmetric state atoms or molecules of said first and second isotopes;
   exposing said beam containing substantially only asymmetric state atoms or molecules to electromagnetic energy of a frequency inducing asymmetric state to symmetric state transitions for atoms or molecules of said second isotope but not for atoms or molecules of said first isotope; and
   removing the symmetric state atoms or molecules from the resultant beam to provide a beam containing substantially only asymmetric state atoms or molecules and enriched in said first isotope.

4. Apparatus for separating isotopes of a substance containing atoms or molecules of first and second isotopes comprising:
   means for providing a beam of said atoms or molecules wherein some of said atoms and molecules of each of said first and second isotopes reside in an asymmetric energy state and other of said atoms or molecules of each of said first and second isotopes reside in a symmetric energy state;
   first state selector means disposed in the path of said beam for removing the symmetric state atoms or molecules from said beam to provide a modified beam containing substantially only asymmetric state atoms or molecules of said first and second isotopes;
   interaction means disposed in the path of said modified beam for interacting said modified beam with electromagnetic energy of a frequency inducing asymmetric state to symmetric state transitions for atoms or molecules of one of said first and second isotopes but not for atoms or molecules of the other of said first and second isotopes; and
   second state selector means disposed in the path of the output beam from said interaction means for removing a selected one of the types of atoms or molecules consisting of asymmetric state atoms or molecules and symmetric state atoms or molecules from said output beam to provide a beam containing substantially only atoms or molecules of the unselected type and enriched in said first isotope.

5. Apparatus according to claim 4 wherein said interaction means includes a microwave cavity resonant at said frequency, and said electromagnetic energy consists of microwaves at said frequency.

6. Apparatus according to claim 4 wherein said atoms or molecules are molecules of $NH_3$, said first isotope is $N^{15}H_3$ and said second isotope is $N^{14}H_3$.

7. Apparatus according to claim 4 wherein said atoms or molecules are molecules of $N^{14}H_2D$ and $N^{14}H_3$, said first isotope is $N^{14}H_2D$ and said second isotope is $N^{14}H_3$.

8. Apparatus for separating isotopes of a substance containing atoms or molecules of first and second isotopes comprising:
   means for providing a beam of said atoms or molecules wherein some of said atoms or molecules of each of said first and second isotopes reside in an asymmetric energy state and other of said atoms or molecules of each of said first and second isotopes reside in a symmetric energy state;
   first state selector means disposed in the path of said beam for removing the symmetric state atoms or molecules from said beam to provide a modified beam containing substantially only asymmetric state atoms or molecules of said first and second isotopes;

interaction means disposed in the path of said modified beam for interacting said modified beam with electromagnetic energy of a frequency inducing asymmetric state to symmetric state transitions for atoms or molecules of said first isotope but not for atoms or molecules of said second isotope; and second state selector means disposed in the path of the output beam from said interaction means for removing the asymmetric state atoms or molecules from said output beam to provide a beam containing substantially only symmetric state atoms or molecules of said first isotope.

9. Apparatus for separating isotopes of a substance containing atoms or molecules of first and second isotopes comprising:

means for providing a beam of said atoms or molecules wherein some of said atoms or molecules of each of said first and second isotopes reside in an asymmetric energy state and other of said atoms or molecules of each of said first and second isotopes reside in a symmetric energy state;

first state selector means disposed in the path of said beam for removing the symmetric state atoms or molecules from said beam to provide a modified beam containing substantially only asymmetric state atoms or molecules of said first and second isotopes;

interaction means disposed in the path of said modified beam for interacting said modified beam with eletromagnetic energy of a frequency inducing asymmetric state to symmetric state transitions for atoms or molecules of said second isotope but not for atoms or molecules of said first isotope; and second state selector means disposed in the path of the output beam from said interaction means for removing the symmetric state atoms or molecules from said output beam to provide a beam containing substantially only asymmetric state atoms or molecules and enriched in said first isotope.

* * * * *